H. SELLS.
HOISTING-JACKS.
No. 194,055. Patented Aug. 14, 1877.
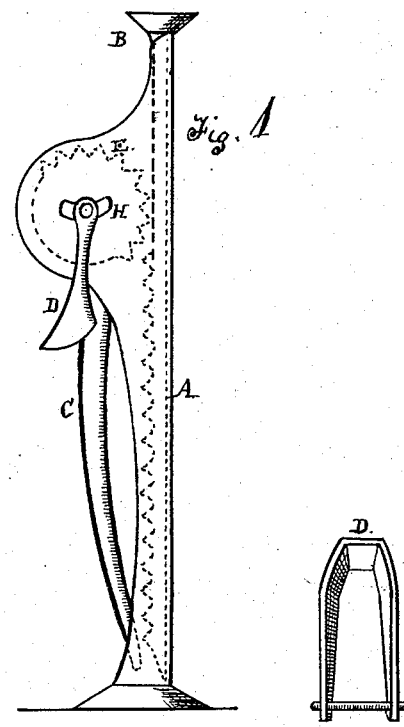
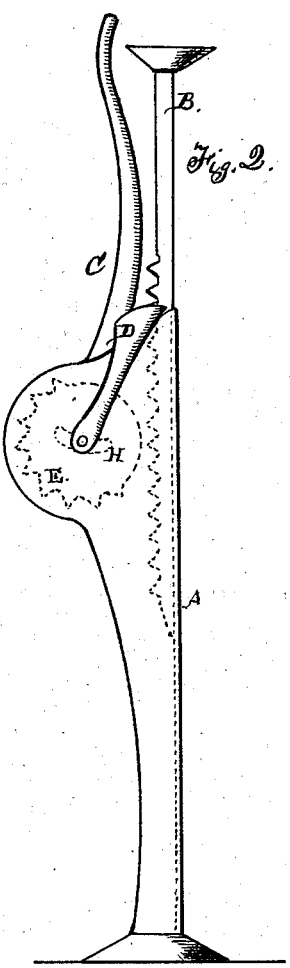
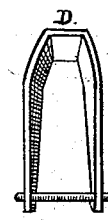
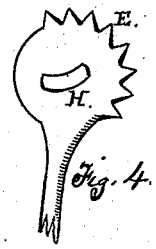
Witnesses.
A. McConnell
Daniel Reigart
Inventor
Hugh Sells.
By his Atty. J. F. Reigart

UNITED STATES PATENT OFFICE.

HUGH SELLS, OF VIENNA, ONTARIO, CANADA.

IMPROVEMENT IN HOISTING-JACKS.

Specification forming part of Letters Patent No. 194,055, dated August 14, 1877; application filed January 26, 1877.

*To all whom it may concern:*

Be it known that I, HUGH SELLS, of Vienna, county of Elgin, Province of Ontario, Canada, have invented new and useful Improvements in Hoisting-Jacks; and I do hereby declare the following to be an exact description thereof, reference being had to the accompanying drawings, and to the letters of reference marked thereon, making a part of this specification, in which—

Figure 1 represents a side elevation of the hoisting-jack. Fig. 2 shows the same with the handle or lever and pawl or dog, with the rack, raised to the height necessary to operate on the axle of a carriage. Fig. 3 is a front view of the pawl. Fig. 4 shows the shape of the circular end of the handle, with cogs on its edge and the slot in the center.

The nature of my invention consists in the combination, construction, and operation of the vertical metallic frame, rack, lever with cogs or teeth, slotted lever, and adjustable pawl, as herein described; and the object is the construction of a light, portable, cheap, and strong metallic hoisting-jack, so as to be carried under the seat of a light carriage, and be convenient whenever required.

A is the frame, made of metal, containing the rack B and cogged lever C, and adjustable pawl D. When required to be used, the rack B and lever C and pawl D are first raised up perpendicularly, as shown at Fig. 2, until the rack B is as high up as may be wanted at any point required to catch the axle of a light carriage. The lever C has its end flattened into a circular form, having teeth E on about two-thirds only of its periphery, the remaining portion being free from contact with the rack B. The teeth on the lever C receive the bearing of two teeth or cogs on the rack—that is, two teeth on the lever gear into two teeth of the rack at the same time when in operation.

The pawl D, which is raised by raising the lever ready for its work, is a curved double metallic plate, wider than the frame A, and pivoted to the frame, while the teeth of the rack B rest upon the wide part of the pawl at the top, and in the upward motion the pawl D follows the rack D without the use of a spring or any other device, and the pawl is self-adjusting.

As the rack and handle fall down out of the way the machine can be reduced in size for easy transportation, as shown at Fig. 1. The rack is raised until it and the lever are parallel, when, the cogs being in gear, the rack is prevented from coming out.

The curved or oblong slot H is for the purpose of shifting gear at any time the dog D is holding. After pressing down on the lever the operator can pull back out of gear and throw up the handle C and catch for another turn, and thus raise the length of rack B without blocking.

What I claim as my invention, and desire to secure by Letters Patent, is—

The metallic frame A, rack B, lever C, with its cogs E E, center curved slot H, and adjustable pawl D, when constructed and operated as herein described, and for the purposes set forth.

HUGH SELLS.

Witnesses:
J. FRANKLIN REIGART,
J. H. CLEMENTS.